(12) United States Patent
Ionescu et al.

(10) Patent No.: US 8,098,455 B2
(45) Date of Patent: Jan. 17, 2012

(54) WIRE-ASSISTED MAGNETIC WRITE DEVICE WITH PHASE SHIFTED CURRENT

(75) Inventors: Stefan A. Ionescu, Burnsville, MN (US); Ladislav R. Pust, Savage, MN (US); Michael T. Johnson, Minneapolis, MN (US); Nurul Amin, Woodbury, MN (US)

(73) Assignee: Seagate Technology LLC, Cupertino, CA (US)

( * ) Notice: Subject to any disclaimer, the term of this patent is extended or adjusted under 35 U.S.C. 154(b) by 1058 days.

(21) Appl. No.: 11/823,432

(22) Filed: Jun. 27, 2007

(65) Prior Publication Data

US 2009/0002883 A1    Jan. 1, 2009

(51) Int. Cl.
   *G11B 5/127*    (2006.01)
(52) U.S. Cl. ............... 360/110; 360/46; 360/59; 360/68; 360/123.01; 360/123.1; 360/125.31
(58) Field of Classification Search .................. None
   See application file for complete search history.

(56) References Cited

U.S. PATENT DOCUMENTS

| | | | |
|---|---|---|---|
| 4,268,584 A | 5/1981 | Ahn et al. | |
| 4,319,264 A | 3/1982 | Gangulee et al. | |
| 4,417,387 A | 11/1983 | Heslop | |
| 4,970,574 A | 11/1990 | Tsunenari | |
| 5,397,921 A | 3/1995 | Karnezos | |
| 5,812,344 A | 9/1998 | Balakrishnan | |
| 5,978,186 A | 11/1999 | Murata et al. | |
| 6,030,877 A | 2/2000 | Lee et al. | |
| 6,063,703 A | 5/2000 | Shinriki et al. | |
| 6,104,562 A * | 8/2000 | Ottesen et al. | 360/63 |
| 6,646,827 B1 | 11/2003 | Khizroev et al. | |
| 6,665,136 B2 | 12/2003 | Clinton et al. | |
| 6,683,002 B1 | 1/2004 | Chooi et al. | |
| 6,798,615 B1 | 9/2004 | Litvinov et al. | |
| 6,812,141 B1 | 11/2004 | Gaidis et al. | |
| 6,879,456 B2 | 4/2005 | Leighton et al. | |
| 6,917,484 B2 | 7/2005 | Ranmuthu | |
| 6,917,493 B2 | 7/2005 | Clinton et al. | |
| 6,954,331 B2 | 10/2005 | Crawford et al. | |
| 6,965,494 B2 | 11/2005 | Campbell et al. | |
| 6,972,916 B1 | 12/2005 | Aram et al. | |
| 7,035,027 B2 * | 4/2006 | Barnett et al. | 360/46 |
| 7,170,714 B2 * | 1/2007 | Coffey et al. | 360/128 |
| 7,724,469 B2 * | 5/2010 | Gao et al. | 360/125.3 |
| 7,855,853 B2 * | 12/2010 | Linville et al. | 360/125.3 |
| 7,961,428 B2 * | 6/2011 | Anagawa et al. | 360/125.01 |
| 2002/0092673 A1 | 7/2002 | Andricacos et al. | |
| 2003/0156359 A1 | 8/2003 | Takahashi et al. | |
| 2004/0075940 A1 * | 4/2004 | Bajorek et al. | 360/110 |

(Continued)

OTHER PUBLICATIONS

Office Action for Chinese Patent Application No. 200810004682.8.

*Primary Examiner* — Dismery Mercedes
(74) *Attorney, Agent, or Firm* — HolzerIPLaw, PC

(57) ABSTRACT

A magnetic device includes a write element having a write element tip and a conductive coil for carrying a current to induce a first field from the write element. A conductor proximate the write element tip carries the current to generate a second field that augments the first field. A driver provides the current to the conductive coil and the conductor, and a circuit phase shifts the current through the conductor relative to the current through the conductive coil.

20 Claims, 5 Drawing Sheets

U.S. PATENT DOCUMENTS

| | | |
|---|---|---|
| 2004/0108136 A1 | 6/2004 | Andricacos et al. |
| 2004/0169950 A1 | 9/2004 | Clinton et al. |
| 2004/0196581 A1 | 10/2004 | VanEaton et al. |
| 2005/0006777 A1 | 1/2005 | Andricacos et al. |
| 2005/0054191 A1 | 3/2005 | Yu et al. |
| 2005/0070097 A1 | 3/2005 | Barmak et al. |
| 2005/0128637 A1 | 6/2005 | Johnston et al. |
| 2005/0174668 A1 | 8/2005 | Fang et al. |
| 2005/0213246 A1* | 9/2005 | Kief et al. ............ 360/125 |
| 2005/0280935 A1* | 12/2005 | Clinton et al. ............ 360/125 |
| 2006/0198047 A1* | 9/2006 | Xue et al. ............ 360/126 |
| 2008/0112080 A1* | 5/2008 | Lengsfield et al. ...... 360/125.04 |

* cited by examiner

WIRE-ASSISTED MAGNETIC WRITE DEVICE WITH PHASE SHIFTED CURRENT

BACKGROUND

The present invention relates to magnetic devices. More particularly, the present invention relates to a magnetic writer including a conductor that carries a phase shifted current to provide a magnetic field that assists a write field.

As magnetic recording storage densities continue to progress in an effort to increase the storage capacity of magnetic storage devices, magnetic transition (i.e., bit) dimensions and critical features of the recording device are being pushed below 100 nm. In some cases, the critical dimensions of the write element are decreasing faster than the spacing between the write element and the magnetic medium. This presents a significant challenge in that not only is the magnetic field strength effectively reduced, but the magnetic field profile at the medium is more poorly confined. The result is that off-track fields can cause undesirable effects such as adjacent track or side track erasure. Thus, an important design consideration is to confine the magnetic fields more effectively without significantly degrading the field strength at the medium.

In addition, making the recording medium stable at higher areal densities requires magnetically harder (i.e., high coercivity) storage medium materials. A magnetically harder medium may be written to by increasing the saturation magnetization value of the magnetic material of the recording device to increase the magnetic field applied to the magnetic medium. However, the rate of increase of the saturation magnetization value is not sufficient to sustain the annual growth rate of bit areal densities. Another approach is to provide a stronger write field by incorporating a write assist device adjacent to the tip of the write element that produces a magnetic field to reduce the coercivity of the magnetic medium near the write element. This allows data to be written to the high coercivity medium with a lower magnetic field from the write element. However, the use of multiple drivers to provide current that generates fields from the write element and the write assist device increases the number of electrical connections in the recording head and can generate undesirable reflections between components of the recording head.

SUMMARY

The present invention relates to a magnetic device including a write element having a write element tip and a conductive coil for carrying a current to induce a first field from the write element. A conductor proximate the write element tip carries the current to generate a second field that augments the first field. A driver provides the current to the conductive coil and the conductor, and a circuit phase shifts the current through the conductor relative to the current through the conductive coil.

DETAILED DESCRIPTION

Figure 1:
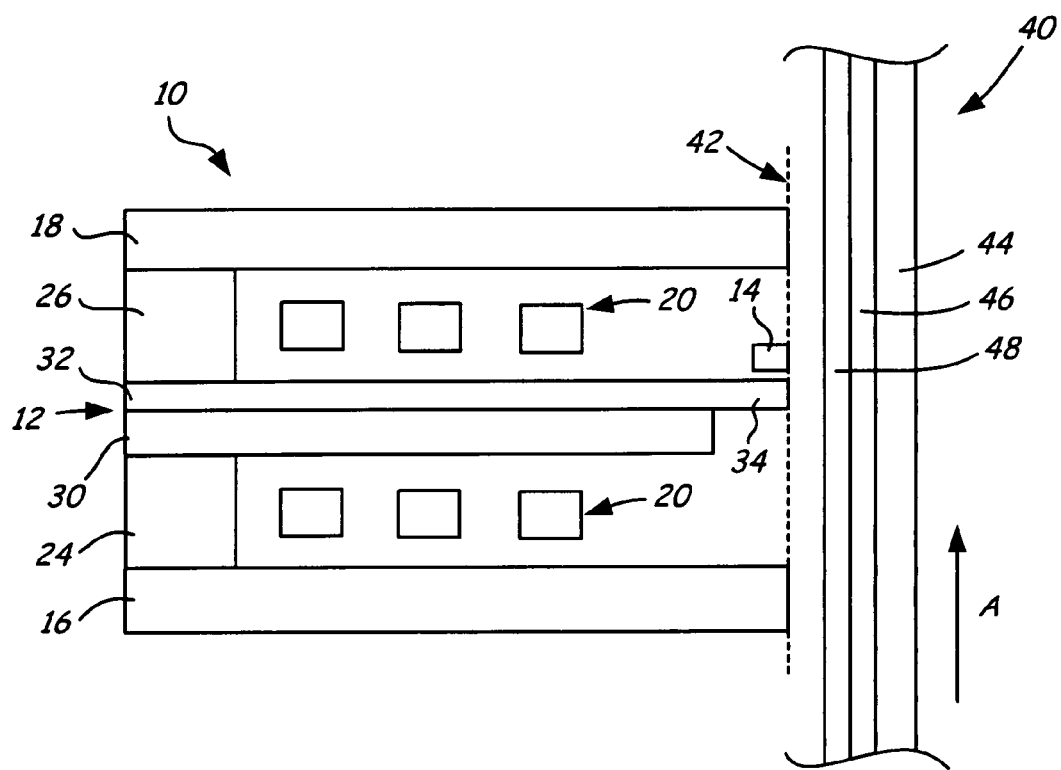
FIG. 1 is cross-section view of a magnetic writer including a write assist conductor proximate a trailing side of the write pole and including an encapsulating layer.

FIG. 1 is a cross-section view of magnetic writer 10, which includes write pole or element 12, current carrying conductor 14, first return pole or element 16, second return pole or element 18, and conductive coil 20. Write pole 12 is magnetically coupled to first return pole 16 by first magnetic stud 24, and to second return pole 18 by second magnetic stud 26. Conductive coil 20 surrounds write pole or element 12 such that portions of conductive coil 20 are disposed between write pole 12 and first return pole 16, and between write pole 12 and second return pole 18. Write pole 12 includes yoke 30 and write pole body 32 having write pole tip 34.

First return pole 16, second return pole 18, first magnetic stud 24, and second magnetic stud 26 may comprise soft magnetic materials, such as NiFe. Conductive coil 20 may comprise a material with low electrical resistance, such as Cu. Write pole body 32 may comprise a high moment soft magnetic material, such as CoFe, and yoke 34 may comprise a soft magnetic material, such as NiFe, to improve the efficiency of flux delivery to write pole body 32.

Magnetic writer 10 confronts magnetic medium 40 at medium confronting surface 42 defined by write pole tip 34, first return pole 16, and second return pole 18. Magnetic medium 40 includes substrate 44, soft underlayer (SUL) 46, and medium layer 48. SUL 46 is disposed between substrate 44 and medium layer 48. Magnetic medium 40 is positioned proximate to magnetic writer 10 such that the surface of medium layer 48 opposite SUL 46 faces write pole 12. Magnetic medium 40 is shown merely for purposes of illustration, and may be any type of medium usable in conjunction with magnetic writer 10, such as composite media, continuous/granular coupled (CGC) media, discrete track media, and bit-patterned media.

Magnetic writer 10 is carried over the surface of magnetic medium 40, which is moved relative to magnetic writer 10 as indicated by arrow A such that write pole 12 trails first return pole 16, leads second return pole 18, and is used to physically write data to magnetic medium 40. In order to write data to magnetic medium 40, a current is caused to flow through conductive coil 20. The magnetomotive force in conductive coil 20 causes magnetic flux to travel from write pole tip 34 perpendicularly through medium layer 48, across SUL 46, and through first return pole 16 and first magnetic stud 24 to provide a first closed magnetic flux path. The direction of the write field at the medium confronting surface of write pole tip 34, which is related to the state of the data written to magnetic medium 40, is controllable based on the direction that the first current flows through first conductive coil 20.

Stray magnetic fields from outside sources, such as a voice coil motor associated with actuation of magnetic writer 10 relative to magnetic medium 40, may enter SUL 46. Due to the closed magnetic path between write pole 12 and first return pole 16, these stray fields may be drawn into magnetic writer 10 by first return pole 16. In order to reduce or eliminate these stray fields, second return pole 18 is connected to write pole 12 via second magnetic stud 26 to provide a flux path for the stray magnetic fields. The stray fields enter first return pole 16, travels through first magnetic stud 24 and second magnetic stud 26, and exits magnetic writer 10 via second return pole 18.

Magnetic writer 10 is shown merely for purposes of illustrating an example construction that may be used in conjunction with the principles of the present invention, and variations on this design may be made. For example, while write pole 12 includes write pole body 32 and yoke 30, write pole 12 can also be comprised of a single layer of magnetic material. In addition, a single trailing return pole 18 may be provided instead of the shown dual return pole writer configuration. Furthermore, a shield may be formed to extend from the trailing return pole toward write pole 22 proximate the medium confronting surface in a "trailing shield" magnetic writer design.

To write data to high coercivity medium layer 48, a stronger write field may be provided to impress magnetization reversal in the medium. To accomplish this, conductor 14 is provided proximate to magnetic medium 40 and the trailing side of write pole tip 34. When a current is applied to conductor 14, an assist magnetic field is generated that augments the write field produced by write pole 12. The combination of the write field and the assist field generated by conductor 14 overcomes the high coercivity of medium layer 48 to permit controlled writing of data to magnetic medium 40. In addition, conductor 14 improves the write field gradient, which provides for a stronger write field proximate to write pole tip 34.

The time-varying current through conductive coil 20 and conductor 14 may be controlled in order to maximize the combined write field from write pole 12 and assist magnetic field from conductor 14 at magnetic medium 40. More specifically, because conductor 14 is positioned at the trailing edge of write pole tip 34, conductor 14 is positionally offset from the bit to be written in magnetic medium 40 when write pole 12 is positioned over the bit to be written. Consequently, current should be provided through conductor 14 prior to providing the current through conductive coil 20 to assure that the peak magnetic field from conductor 14 is applied to the bit to be written at substantially the same time as the peak magnetic field is generated by write pole 12. One approach to accomplishing this is to phase shift the current through conductive coil 20 relative to the current through conductor 14.

Figure 2:
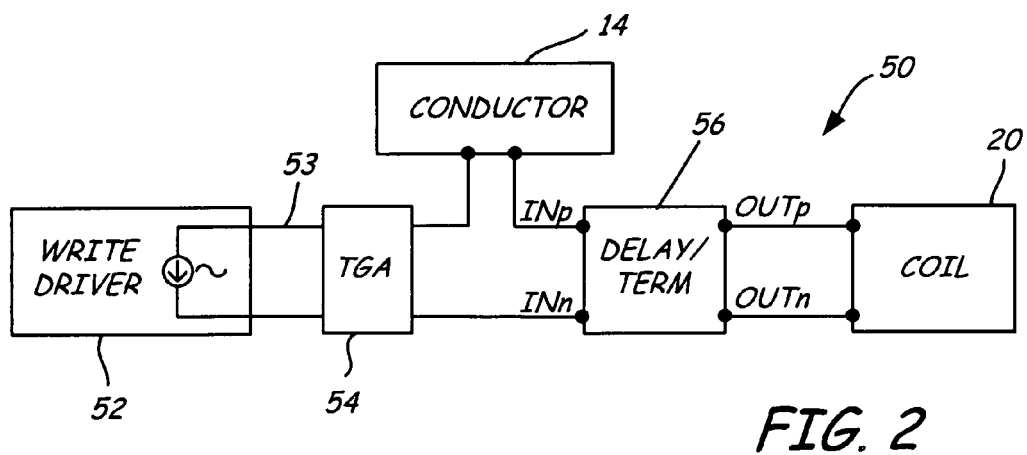
FIG. 2 is a block diagram of an assembly for connecting a conductive coil and a write assist conductor to a single current driver.

FIG. 2 is a block diagram of circuit assembly 50 for connecting conductor 14 and conductive coil 20 to write current driver 52 through differential write path 53. Circuit assembly 50 also includes trace gimbal assembly (TGA) 54 and delay and termination circuit 56. Write driver 52 provides an AC current signal to TGA 54. Conductor 14 is connected between TGA 54 and node INp of delay and termination circuit 56. Conductive coil 20 is connected in series with nodes OUTp and OUTn of delay and termination circuit 56. Node INn of delay and termination circuit 56 is connected to TGA 54.

TGA 54 represents a plurality of conductive traces that connect the leads from the various components of the recording head to other components of the magnetic recording system (e.g., preamplifier). While only the connections to write driver 52, conductive coil 20, and delay and termination circuit 56 are shown, it will be appreciated that TGA 54 may interconnect multiple other components in the magnetic recording system.

In circuit assembly 50, conductor 14 and conductive coil 20 are connected in series via write path 53. This allows a single write driver 52 to provide current to conductor 14 and conductive coil 20, which reduces the power consumption relative to a system including dedicated current drivers for each of conductor 14 and conductor coil 20. In order to phase shift the current through conductor 14 relative to the current through conductive coil 14, the current signal may be delayed between conductor 14 and conductive coil 20 to provide a current signal through conductor 14 that is offset relative to the current signal through conductive coil 20. In order to accomplish this, delay and termination circuit 56 is connected between conductor 14 and conductive coil 20. Delay and termination circuit 56 may be, for example, an RC delay circuit or an RLC delay circuit. The complexity of delay and termination circuit 56 may be a function of the space available on the slider that carries the recording head, particularly with regard to the implementation of capacitors and high Q inductors. In addition, the complexity of delay and termination circuit 56 may be minimized to the extent that it affects the maximum transfer rate achievable by circuit assembly 50.

Figure 3:
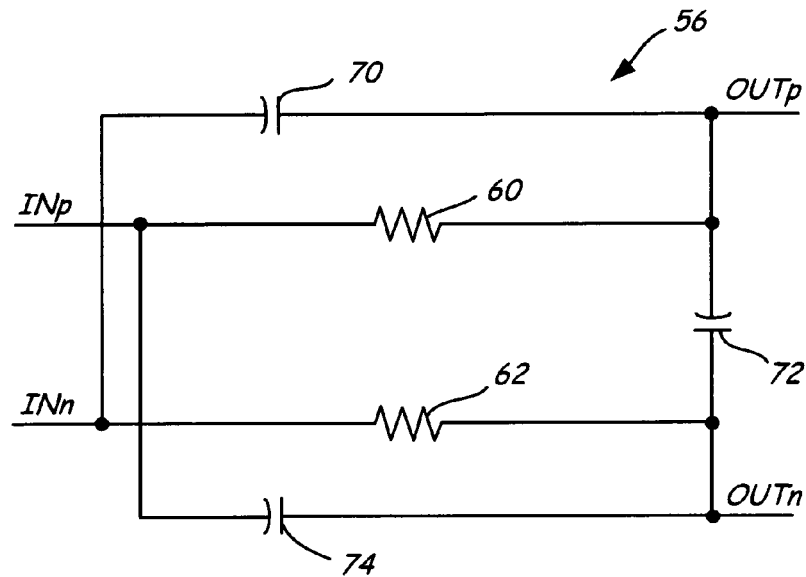
FIG. 3 is a schematic view of a delay circuit for phase shifting the current through the write assist conductor relative to the current through the conductive coil.

FIG. 3 is a schematic view of an example RC delay and termination circuit 56 for phase shifting the current through conductor 14 relative to the current through conductive coil 20. Delay and termination circuit 56 includes resistors 60 and 62, and capacitors 70, 72, and 74. Resistor 60 is connected between input node INp and output node OUTp, and resistor 62 is connected between input node INn and output node OUTn. Capacitor 70 is connected between input node INn and output node OUTp, capacitor 72 is connected between output nodes OUTp and OUTn, and capacitor 74 is connected between input node INp and output node OUTn.

Resistors 60 and 62 and capacitors 70, 72, and 74 have component values that delay the current signal between conductive coil 20 and conductor 14 to provide the desired amount of phase shift in the current signal. That is, the component values for resistors 60 and 62 and capacitors 70, 72, and 74 are selected to set the RC time constant of delay and termination circuit 56 to provide a corresponding delay in the current signal.

The electrically conductive traces that connect TGA 54 to delay and termination circuit 56 function as a transmission line with a characteristic impedance. Consequently, the values for resistors 60 and 62 may be selected to match the impedance of delay and termination circuit 56 with the differential impedance of write path 53 from TGA 54 to prevent signal reflections between these two components. Write driver 52 may also be impedance matched with TGA 54 to prevent signal reflections between them.

Figure 4:
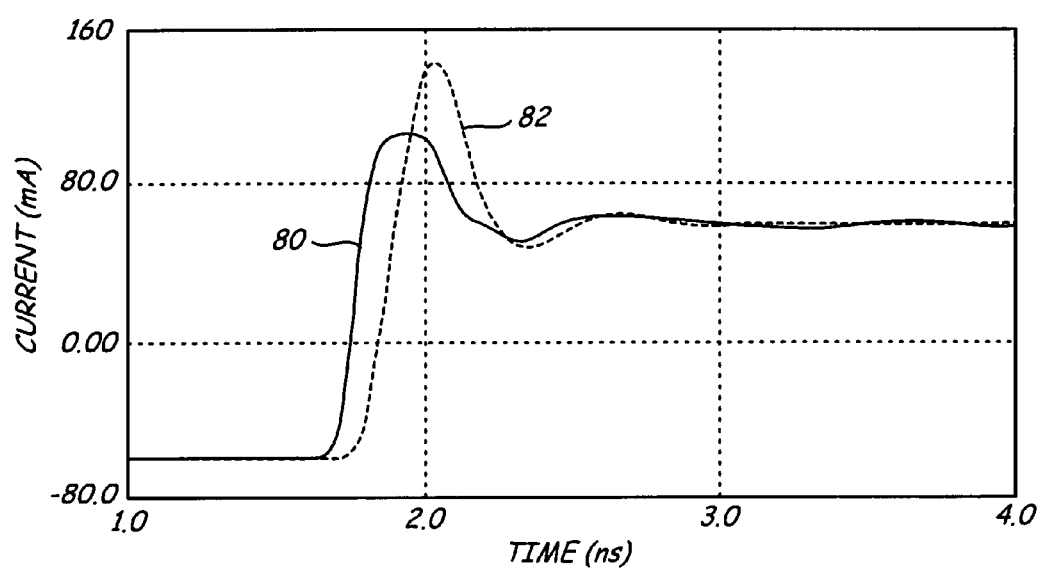
FIG. 4 is a graph of the current through the conductive coil and the write assist conductor as a function of time.

FIG. 4 is a graph of the current response through conductor 14 and conductive coil 20 when delay and termination circuit 56 is connected between them as shown in FIG. 2. In particular, line 80 plots the current through conductive coil 20 as a function of time and line 82 plots the current through conductor 14 as a function of time. The current through conductive coil 20 (line 80) reaches peak amplitude prior to the current through conductor 14 (line 82). Consequently, due to the offset in position between conductor 14 and write pole tip 34, the peak magnetic field from conductor 14 is applied to the bit to be written at substantially the same time as the peak magnetic field is generated by write pole 12. In addition, delay and termination circuit 56 reduces the overshoot of the current through conductive coil 20, which provides a more controlled write field.

Some components of delay and termination circuit 56 may dissipate a large amount of heat. The heat dissipative components may be any type of electrical component that is used to provide delay and/or termination in circuit assembly 50 including, but not limited to, resistors, inductors, diodes, and transistors. As will be described in more detail below, the location of the heat dissipative components of delay and termination circuit 56 on the slider is important to avoid deterioration of the fly performance of the slider and to minimize the effect on performance of magnetic writer 10.

Figure 5:
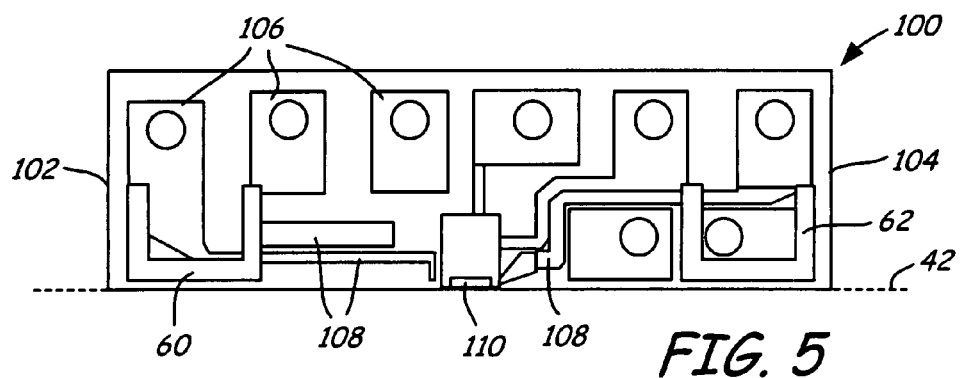
FIG. 5 is a top view of a slider including the magnetic writer and termination resistors fabricated distal from the magnetic writer and proximate the medium confronting surface.

FIG. 5 is a top view of slider 100 having a first side 102 and a second side 104 that are perpendicular to medium confronting surface 42. Slider 100 includes contacts or connection pads 106, which are connected to electrical traces 108 and provide electrical contact points between the magnetic recording head 110 and other components of the magnetic recording system. Magnetic recording head 110 includes magnetic writer 10 shown in FIG. 1, and may include other features related to writing to and reading from magnetic medium 40, such as the magnetic reader.

Resistor 60 from delay and termination circuit 56 is fabricated on slider 100 proximate side 102 and medium confronting surface 42, while resistor 62 from delay and termination circuit 56 is fabricated on slider 100 proximate side 104 and medium confronting surface 104. In some embodiments, resistors 60 and 62 are formed during the wafer deposition process between the deposition of the basecoat layer and the deposition of the top surface of the overcoat layer. In the embodiment shown in FIG. 5, resistors 60 and 62 are formed near the top surface of the overcoat layer. The formation of resistors 60 and 62 during the wafer deposition process is more time- and cost-effective than forming resistors 60 and 62 during or after bar or slider level processing.

Resistors 60 and 62 are formed distal from magnetic recording head 110 to minimize the effect of heat dissipation by resistors 60 and 62 on the performance of slider 100 and magnetic recording head 110. More specifically, by positioning resistors 60 and 62 proximate sides 102 and 104, respectively, thermal deformation of slider 100 at medium confronting surface 42 caused by the heat dissipation by resistors 60 and 62 is localized to regions distal from magnetic recording head 110. This minimizes the effect not only on the flyability of slider 100, but also on the spacing between magnetic recording head 110 and magnetic medium 40 (FIG. 1). In addition, because heat is dissipated by resistors 60 and 62 away from magnetic recording head 110 on slider 100, the operating temperature of magnetic recording head 110 is not substantially affected, which improves the performance and durability of magnetic recording head 110.

The heat dissipative components of delay and termination circuit 56 are arranged on slider 100 such that a first portion of the heat dissipative components are fabricated proximate side 102 and a second portion of the heat dissipative components are fabricated proximate side 104 (e.g., resistors 60 and 62 in FIG. 5). In some embodiments, the first and second portions of the heat dissipative components each dissipate substantially the same amount of heat. This assures that the thermal deformation caused by the heat dissipative components is substantially balanced between sides 102 and 104 of slider 100. In any case, one of the first and second portions should dissipate no more than about two times the heat of the other of the first and second portions. With these considerations, the number of heat dissipative components formed on each side 102 and 104 may be the same or a different number of heat dissipative components may be formed on each side 102 and 104. For those embodiments in which the number of heat dissipative components on sides 102 and 104 is not equal, the total heat dissipated by all heat dissipative components on one side 102/104 should be approximately equal to the total heat dissipated by all heat dissipative components on the other side 102/104.

Figure 6:
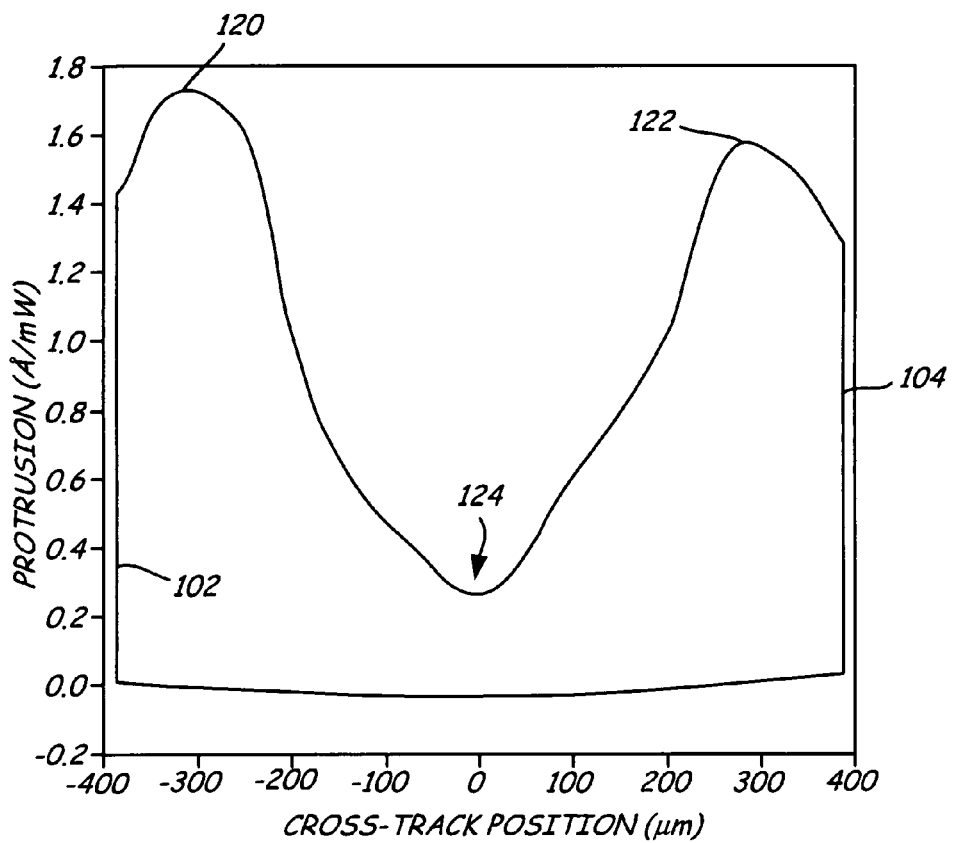
FIG. 6 is a graph of the maximum thermal protrusion of the slider shown in FIG. 5 at the medium confronting surface as a function of cross-track position.

To illustrate the effect of forming resistors 60 and 62 on slider 100 as shown in FIG. 5, FIG. 6 is a graph of the maximum thermal protrusion of slider 100 at medium confronting surface 42 as a function of cross-track position. The center of magnetic recording head 110 is represented by cross-track position 0.0 µm, with decreasing cross-track positions extending toward side 102 and increasing cross-track positions extending toward side 104. As is shown, the maximum protrusion of slider 100 proximate side 102, which is labeled point 120, is near the center of resistor 60. Similarly, the maximum protrusion of slider 100 proximate side 104, which is labeled point 122, is near the center of resistor 62. The minimum protrusion of slider 100, which is labeled point 124, is about midway between side 102 and 104 proximate magnetic recording head 110. Thus, because the heat dissipated by resistors 60 and 62 generates very little deformation of slider 100 around magnetic recording head 110, good head to medium spacing is maintained, and the effect on the flyability of slider 100 is minimized.

Figure 7:
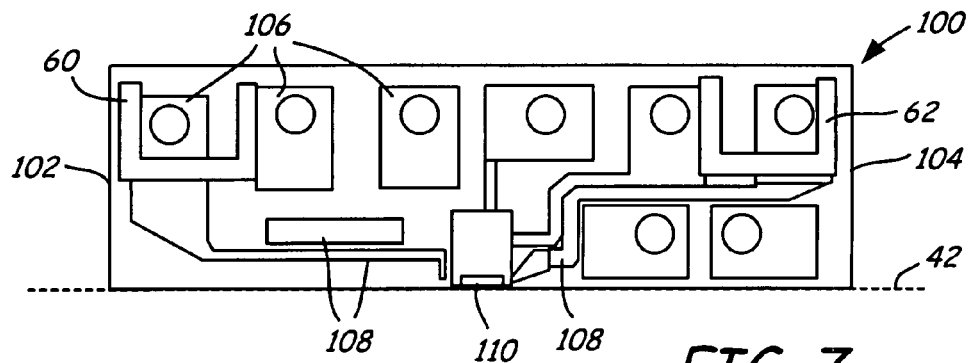
FIG. 7 is a top view of a slider including the magnetic writer and termination resistors fabricated distal from the magnetic writer and distal the medium confronting surface.

FIG. 7 is a top view of slider 100 including resistors 60 and 62 formed in an alternative configuration. In particular, resistors 60 and 62 are formed proximate sides 102 and 104, respectively, but distal from medium confronting surface 42. Similar to the embodiment shown in FIG. 5, resistors 60 and 62 are formed near the top surface of the overcoat layer.

Figure 8:
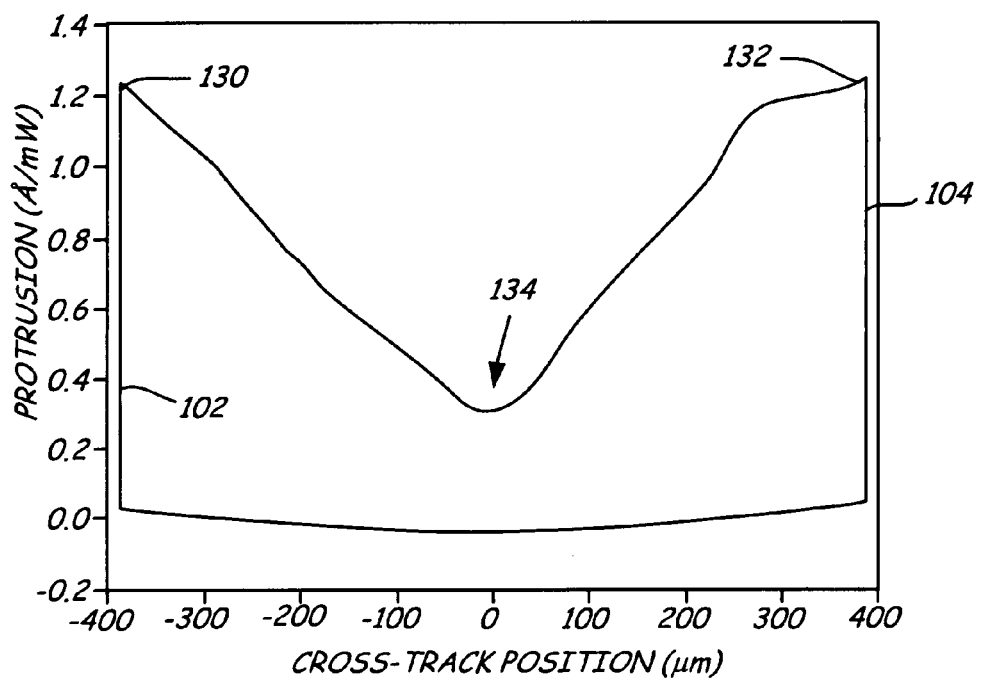
FIG. 8 is a graph of the maximum thermal protrusion of the slider shown in FIG. 7 at the medium confronting surface as a function of cross-track position.

FIG. 8 is a graph of the maximum thermal protrusion of slider 100 shown in FIG. 7 at medium confronting surface 42 as a function of cross-track position. The maximum protrusion of slider 100 proximate side 102, which is labeled point 130, is near the edge of resistor 60 that is proximate side 102. Similarly, the maximum protrusion of slider 100 proximate side 104, which is labeled point 132, is near the edge of resistor 62 that is proximate side 104. The minimum protrusion of slider 100, which is labeled point 134, is again about midway between side 102 and 104 proximate magnetic recording head 110. In this embodiment, the protrusion of slider 100 near sides 102 and 104 is less than that of the embodiment shown in FIG. 5, while the protrusion of slider 100 around magnetic recording head 110 is slightly greater than that of the embodiment shown in FIG. 5. Thus, if less protrusion around magnetic recording head 110 is preferred, the heat dissipating components should be formed proximate medium confronting surface 42. On the other hand, if less protrusion across the whole medium confronting surface 42 is preferred, the heat dissipating components should be formed distal from medium confronting surface 42.

In summary, the present invention relates to a magnetic device including a write element having a write element tip and a conductive coil for carrying a current to induce a first field from the write element. A conductor proximate the write element tip carries the current to generate a second field that augments the first field. A driver provides the current to the conductive coil and the conductor, and a circuit phase shifts the current through the conductor relative to the current through the conductive coil. The circuit may be configured to reduce overshoot of the current in the conductor and the circuit may be impedance matched to prevent reflections back to the driver circuit. In some embodiments, the magnetic device is carried on a slider and heat dissipative components of the circuit are positioned distal from the write element to minimize the effect on performance of the slider and magnetic device.

Although the present invention has been described with reference to preferred embodiments, workers skilled in the art will recognize that changes may be made in form and detail without departing from the spirit and scope of the invention.

The invention claimed is:

1. A magnetic device comprising:
   a write element including a write element tip;
   a conductive coil carrying a current to induce a first field from the write element;
   an assist device proximate the write element tip configured to generate a second field that augments the first field;
   a driver for providing current to the conductive coil and the assist device; and
   a circuit to phase shift the current through the assist device relative to the current through the conductive coil during a write operation.

2. The magnetic device of claim 1, wherein the circuit is impedance matched to the driver.

3. The magnetic device of claim 1, wherein the circuit comprises a delay circuit.

4. The magnetic device of claim 1, wherein at least of a portion the circuit is distal from the write element in the magnetic device.

5. The magnetic device of claim 1, wherein the assist device is connected in series with the circuit.

6. An assembly comprising:
   a write element having an external surface;
   a conductive coil for carrying a current to induce a first field from the write element;
   a write assist device proximate the external surface of the write element configured to generate a second field that augments the first field;
   a driver for providing current to the conductive coil and the write assist device;
   a circuit to phase shift the current through the write assist device relative to the current through the conductive coil during a write operation; and
   a slider that carries the write element, write assist device, conductive coil, and circuit.

7. The assembly of claim 6, wherein the circuit is impedance matched to the driver.

8. The assembly of claim 6, wherein the write assist device is connected in series with the circuit.

9. The assembly of claim 6, wherein at least a portion of the circuit is positioned distal from the write element in the magnetic device.

10. The assembly of claim 6, wherein the circuit comprises a plurality of heat dissipative components.

11. The assembly of claim 10, wherein the plurality of heat dissipative components is arranged on the slider such that a first portion of the plurality of heat dissipative components is proximate a first side of the slider and a second portion of the plurality of heat dissipative components is proximate a second side of the slider, and wherein the write element is between the first side and the second side.

12. The assembly of claim 11, wherein the first portion of the plurality of heat dissipative components dissipates less than about two times the heat of the second portion of the plurality of heat dissipative components.

13. The assembly of claim 11, wherein the first portion of heat dissipative components and the second portion of heat dissipative components dissipate substantially the same amount of heat.

14. The assembly of claim 11, wherein the heat dissipative components are proximate the medium confronting surface.

15. The assembly of claim 11, wherein the heat dissipative components are distal from the medium confronting surface.

16. An assembly comprising:
    a substrate;
    a transducer on the substrate that generates a first field as a function of an applied current;
    an assist device proximate the transducer configured to generate a second field that augments the first field; and
    a circuit on the substrate distal from the transducer, wherein the circuit phase shifts current applied through the assist device relative to the current through the transducer during a write operation.

17. The assembly of claim 16, wherein the assist device is connected in series with the circuit.

18. The assembly of claim 16, wherein the circuit comprises a plurality of heat dissipative components.

19. The assembly of claim 18, wherein the plurality of heat dissipative components is arranged on the slider such that a first portion of the plurality of heat dissipative components is proximate a first side of the slider and a second portion of the plurality of heat dissipative components is proximate a second side of the slider, and wherein the write element is between the first side and the second side.

20. The assembly of claim 19, where the first portion of the plurality of heat dissipative components dissipates less than two times the heat of the second portion of the plurality of heat dissipative components.

* * * * *